United States Patent
Schaefer et al.

(10) Patent No.: US 11,542,361 B2
(45) Date of Patent: Jan. 3, 2023

(54) THERMOPLASTIC POLYURETHANE

(71) Applicant: BASF SE, Ludwigshafen am Rhein (DE)

(72) Inventors: Frank Schaefer, Lemfoerde (DE); Elmar Poeselt, Lemfoerde (DE); Sirus Zarbakhsh, Ludwigshafen (DE)

(73) Assignee: BASF SE

( * ) Notice: Subject to any disclaimer, the term of this patent is extended or adjusted under 35 U.S.C. 154(b) by 417 days.

(21) Appl. No.: 16/623,651

(22) PCT Filed: Jun. 26, 2018

(86) PCT No.: PCT/EP2018/067060
§ 371 (c)(1),
(2) Date: Apr. 27, 2020

(87) PCT Pub. No.: WO2019/002263
PCT Pub. Date: Jan. 3, 2019

(65) Prior Publication Data
US 2020/0362092 A1    Nov. 19, 2020

(30) Foreign Application Priority Data
Jun. 26, 2017 (EP) .................................... 17177881

(51) Int. Cl.
| | |
|---|---|
| C08J 5/18 | (2006.01) |
| C08G 18/76 | (2006.01) |
| B29C 48/00 | (2019.01) |
| B29C 48/08 | (2019.01) |
| C08G 18/22 | (2006.01) |
| C08G 18/24 | (2006.01) |
| C08G 18/42 | (2006.01) |
| C08G 18/66 | (2006.01) |
| C08K 3/34 | (2006.01) |
| B29K 75/00 | (2006.01) |
| B29K 101/12 | (2006.01) |
| B29K 105/00 | (2006.01) |
| B29K 105/16 | (2006.01) |

(52) U.S. Cl.
CPC ........ *C08G 18/7671* (2013.01); *B29C 48/022* (2019.02); *B29C 48/08* (2019.02); *C08G 18/222* (2013.01); *C08G 18/244* (2013.01); *C08G 18/4238* (2013.01); *C08G 18/664* (2013.01); *C08J 5/18* (2013.01); *C08K 3/34* (2013.01); *B29K 2075/00* (2013.01); *B29K 2101/12* (2013.01); *B29K 2105/0014* (2013.01); *B29K 2105/0044* (2013.01); *B29K 2105/16* (2013.01); *C08G 2120/00* (2013.01); *C08J 2375/06* (2013.01)

(58) Field of Classification Search
CPC .............. C08G 18/7671; C08G 18/222; C08G 18/244; C08G 18/4238; C08G 18/664; C08G 2120/00; C08G 18/0895; C08G 18/24; C08G 2101/00; C08J 5/18; C08J 2375/06; C08J 9/00; C08K 3/34; B29K 2105/16; B29K 2075/00; B29K 2101/12; B29K 2105/0014; B29K 2105/0044; B29C 48/08; B29C 48/022
USPC ........................................................ 524/437
See application file for complete search history.

(56) References Cited

U.S. PATENT DOCUMENTS

| | | | |
|---|---|---|---|
| 5,695,884 A | 12/1997 | Ishimaru et al. | |
| 8,790,763 B2* | 7/2014 | Farkas | C08G 18/664 |
| | | | 528/84 |
| 10,279,516 B2 | 5/2019 | Däschlein et al. | |
| 11,124,594 B2* | 9/2021 | Wettach | C08G 18/4238 |
| 11,414,543 B2* | 8/2022 | Tomovic | C08G 18/3206 |
| 2006/0121812 A1 | 6/2006 | Suzuki et al. | |
| 2006/0141883 A1 | 6/2006 | Nishiguchi et al. | |
| 2008/0139776 A1 | 6/2008 | Scholz et al. | |
| 2010/0222442 A1 | 9/2010 | Prissok et al. | |

(Continued)

FOREIGN PATENT DOCUMENTS

| | | |
|---|---|---|
| EP | 0 922 552 A1 | 6/1999 |
| WO | WO 94/20568 A1 | 9/1994 |

(Continued)

OTHER PUBLICATIONS

International Preliminary Report on Patentability dated Dec. 26, 2019 in PCT/EP2018/067060 (submitting English translation only), 6 pages.
Kunststoffhandbuch, Band VII, ed. Vieweg and Höchtlen, Carl Hanser Veriag, München, 1966, pp. 103-113.
U.S. Appl. No. 16/481,709, filed Jul. 29, 2019, US 2019-0389979 A1, Roy, N., et al.
U.S. Appl. No. 16/484,658, filed Aug. 8, 2019, US 2020-0048396 A1, Richter, S., et al.

*Primary Examiner* — Hannah J Pak
(74) *Attorney, Agent, or Firm* — Grüneberg and Myers PLLC

(57) ABSTRACT

The present invention relates to thermoplastic polyurethanes obtainable or obtained by reacting at least a polyisocyanate composition comprising at least one polyisocyanate, at least one chain extender, and at least one polyol composition, wherein the polyol composition comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms, preferably butane-1,4-diol. The present invention also relates to a preparation process for such thermoplastic polyurethanes and also to the use of a thermoplastic polyurethane according to the invention or of a thermoplastic polyurethane obtainable or obtained by a process according to the invention for the production of extrusion products, films and shaped bodies or for the production of polymer compositions.

11 Claims, No Drawings

(56) References Cited

U.S. PATENT DOCUMENTS

| | | |
|---|---|---|
| 2010/0239803 A1 | 9/2010 | Farkas et al. |
| 2014/0107311 A1 | 4/2014 | Farkas |
| 2014/0256902 A1 | 9/2014 | Bräuer et al. |
| 2014/0333001 A1 | 11/2014 | Farkas et al. |
| 2016/0152761 A1 | 6/2016 | Wettach et al. |
| 2019/0359823 A1* | 11/2019 | Tomovic ............ C08G 18/4216 |
| 2021/0163660 A1* | 6/2021 | Richter ............ C08G 18/7671 |

FOREIGN PATENT DOCUMENTS

| | | |
|---|---|---|
| WO | WO 00/51660 A1 | 9/2000 |
| WO | WO 2006/082183 A1 | 8/2006 |
| WO | WO 2007/082838 A1 | 7/2007 |
| WO | WO 2010/107562 A1 | 9/2010 |
| WO | WO 2012/173911 A1 | 2/2012 |
| WO | WO 2013/045546 A1 | 4/2013 |
| WO | WO 2014/198779 A1 | 12/2014 |
| WO | WO 2015/000722 A1 | 1/2015 |

\* cited by examiner

THERMOPLASTIC POLYURETHANE

The present invention relates to thermoplastic polyurethanes obtainable or obtained by reacting at least a polyisocyanate composition comprising at least one polyisocyanate, at least one chain extender, and at least one polyol composition, wherein the polyol composition comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms, preferably butane-1,4-diol. The present invention also relates to a preparation process for such thermoplastic polyurethanes and also to the use of a thermoplastic polyurethane according to the invention or of a thermoplastic polyurethane obtainable or obtained by a process according to the invention for the production of extrusion products, films and shaped bodies or for the production of polymer compositions. The polyurethanes according to the invention display a low tendency to blooming.

Thermoplastic polyurethanes for various applications are known in principle from the prior art. By the variation in the feedstocks, it is possible to obtain different profiles of properties. Polyester polyols are used in particular for high-quality polyurethane products because of their favorable properties.

For instance, U.S. Pat. No. 5,695,884 discloses the use of polyester polyols based on sebacic acid for thermoplastic polyurethanes having high crystallinity. US 2006/0141883 A1 and US 2006/0121812 also describe the use of polyester polyols based on sebacic acid for polyurethanes for fibers having a high melting point. WO 00/51660 A1 describes polyurethanes for cardiac catheters in which polyester polyols based on sebacic acid can be used. Here too, sufficient hardness is required.

When using polyester polyols for the preparation of polyurethanes, however, the problem of very strong blooming increasingly arises, that is to say a white coating forms on the processed polyurethane so that visually it is no longer acceptable for many potential applications.

WO 2010/107562 A1 discloses a thermoplastic polyurethane obtained from the reaction product of propane-1,3-diol and a dicarboxylic acid. The document describes that a polyurethane obtained or obtainable using a homopolyester based on adipic acid and propanediol undergoes less blooming than a corresponding polyurethane obtained or obtainable using a homopolyester based on adipic acid and butane-diol.

For many applications, however, the mechanical properties described in said document are insufficient.

It is an object of the present invention to provide thermoplastic polyurethanes possessing good mechanical properties and in addition having a reduced tendency to blooming.

According to the invention, this object is achieved by a thermoplastic polyurethane obtainable or obtained by reacting at least the components (i) to (iii):
 (i) a polyisocyanate composition comprising at least one polyisocyanate,
 (ii) at least one chain extender, and
 (iii) at least one polyol composition,
wherein the polyol composition comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms.

It has surprisingly been found that the inventive thermoplastic polyurethanes based on polyesters of polyol mixtures comprising propane-1,3-diol and a further did (D1) having 2 to 12 carbon atoms display, compared to those based on polyesters of pure diols, a markedly reduced tendency to blooming and at the same time have good mechanical properties that are comparable to commercially available thermoplastic polyurethanes.

According to the invention, at least the components (i) to (iii) are reacted. For the preparation of the polyurethanes according to the invention, a polyol composition is used which comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms.

The mixture (M1) comprises propane-1,3-diol and a further dial (D1) having 2 to 12 carbon atoms. The dial (D1) is preferably selected from the group consisting of ethylene glycol, butane-1,4-diol and hexane-1,6-diol. Butane-1,4-diol is particularly preferred according to the invention. According to the invention, the mixture (M1) may also comprise, in addition to propane-1,3-diol, 2 or more dials having 2 to 12 carbon atoms.

In a further embodiment, the present invention therefore relates to a thermoplastic polyurethane as described above, wherein the did (D1) is selected from the group consisting of ethylene glycol, butane-1,4-diol and hexane-1,6-diol. In a further embodiment, the present invention relates to a thermoplastic polyurethane as described above, wherein the dial (D1) is butane-1,4-diol. Accordingly, the present invention also relates to a thermoplastic polyurethane obtainable or obtained by reacting at least the components (i) to (iii):
 (i) a polyisocyanate composition comprising at least one polyisocyanate,
 (ii) at least one chain extender, and
 (iii) at least one polyol composition,
wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol.

According to the invention, it is possible in principle here to use any suitable polyesterols known to those skilled in the art. According to the invention, the polyester polyols used in this case preferably have an average functionality in the range from 1.8 to 2.3, preferably in the range from 1.9 to 2.2, especially of 2. The polyester polyol of the invention is preferably a polyester dial.

Suitable molecular weight ranges for the polyester polyols used according to the invention are known per set to those skilled in the art. In a preferred embodiment, the molecular weight of the polyester polyol is in the range from 750 to 3000 g/mol, especially preferably in the range of 800 and 2500 g/mol and very particularly preferably in the range of 1000 and 2000 g/mol.

In a further embodiment, the present invention therefore relates to a thermoplastic polyurethane as described above, wherein the polyester polyol (P1) has a molecular weight Mw in the range from 750 to 3000 g/mol.

Particularly suitable polyester polyols according to the invention have an OH number in the range from 25 to 230 mg KOH/g, particularly preferably in the range from 35 to 140 mg KOH/g and very particularly preferably in the range from 40 to 115 mg KOH/g.

According to the invention, the polyester polyol (P1) is obtainable or obtained by reacting an aliphatic dicarboxylic acid having 2 to 12 carbon atoms and a mixture (M1) comprising propane-1,3-diol and a further dial (D1) having 2 to 12 carbon atoms, preferably butane-1,4-dial.

Within the context of the present invention, the mixing ratio of propane-1,3-diol and the diol (D1) in the mixture (M1) can vary within wide limits. For example, the ratio of propane-1,3-diol and the dial (D1) can be in a range from 3:1 to 1:3. According to the invention, the ratio of propane-1, 3-diol and butane-1,4-diol in particular can be in a range from 3:1 to 1:3.

In a further embodiment, the present invention therefore relates to a thermoplastic polyurethane as described above, wherein the mixture (M1) comprises propane-1,3-diol and the dial (D1) in a ratio in the range from 3:1 to 1:3. In a further embodiment, the present invention also relates to a thermoplastic polyurethane as described above, wherein the mixture (M1) comprises propane-1,3-diol and butane-1,4-diol in a ratio in the range from 3:1 to 1:3.

According to the invention, the ratio of propane-1,3-diol and the diol (D1), in particular the ratio of propane-1,3-diol and butane-1,4-diol, can by way of example also be in a range from 2.5:1 to 1:2.5, or in the range from 2:1 to 1:2 or in the range from 1.5:1 to 1:1.5 or even be 1:1.

The mixture (M1) may comprise further components here, for example solvents or further polyhydric alcohols. Suitable polyhydric alcohols are, for example, polyhydric aliphatic alcohols, for example aliphatic alcohols having 2, 3, 4 or more OH groups, for example 2 or 3 OH groups. Aliphatic alcohols which are suitable according to the invention are, for example, C2 to C12 alcohols, preferably C2 to C8 alcohols and very particularly preferably C2 to C6 alcohols. Suitable further aliphatic C2 to C6 diols are for example diethylene glycol, 3-oxapentane-1,5-diol, propane-1,2-diol, dipropylene glycol, pentane-1,5-diol, 2-methylpropane-1,3-diol and 3-methylpentane-1,5-diol.

In a further embodiment, the present invention therefore relates to a thermoplastic polyurethane as described above, wherein the mixture (M1) comprises a further dial.

Preferably, the mixture (M1) comprises no further alcohols besides propane-1,3-diol and the dial (D1), in particular besides propane-1,3-diol and butane-1,4-diol. In a particularly preferred embodiment, the mixture (M1) comprises no further components besides propane-1,3-diol and the dial (D1), in particular besides propane-1,3-diol and butane-1,4-diol.

It is also possible according to the invention to use propanediol and/or a further diol, for example butanediol, which have been obtained at least partially from renewable raw materials. It is possible in this case that the polyhydric alcohol has been obtained partially or entirely from renewable raw materials. According to the invention, at least one of the polyhydric alcohols used may be obtained at least partially from renewable raw materials.

The propane-3-diol may accordingly be synthetically prepared propane-1,3-diol, but in particular propane-3-diol from renewable raw materials ("bio-propane-1,3-diol"). Bio-propane-1,3-diol can for example be obtained from corn and/or sugar. A further possibility is the conversion of glycerol wastes from biodiesel production. In a further preferred embodiment of the invention, the polyhydric alcohol is propane-1,3-diol that has been at least partially obtained from renewable raw materials.

In a further embodiment, the present invention also relates to a polyurethane as described above, wherein the at least one polyhydric alcohol is propane-1,3-diol that has been at least partially obtained from renewable raw materials.

According to the invention, an aliphatic dicarboxylic acid having 2 to 12 carbon atoms is used to prepare the polyester polyol (P1).

Within the context of the present invention, the dicarboxylic acid used may be linear or branched. Within the context of the present invention, the dicarboxylic acid is preferably selected from dicarboxylic acids having 4 to 12 carbon atoms, particularly preferably from dicarboxylic acids having 6 to 10 carbon atoms. Within the context of the present invention, the dicarboxylic acid used is especially preferably adipic acid. According to the invention, it is also possible to use mixtures of two or more of the dicarboxylic acids mentioned.

In a further embodiment, the present invention therefore relates to a thermoplastic polyurethane as described above, wherein the aliphatic dicarboxylic acid is adipic acid.

In a preferred embodiment of the present invention, no further components besides the mixture (M1) and the aliphatic dicarboxylic acid having 2 to 12 carbon atoms are used to prepare the polyester polyol (P1). Accordingly, in a particularly preferred embodiment of the present invention, adipic acid and the mixture (M1) consisting of propane-1, 3-diol and the diol (D1) are used to prepare the polyester polyol (P1).

For the preparation of the thermoplastic polyurethane according to the invention, at least one chain extender is used as component (ii).

Suitable chain extenders are known in principle to those skilled in the art. Examples of suitable compounds are those having at least two isocyanate-reactive functional groups, for example hydroxyl groups, amino groups or thiol groups. In a further embodiment, the present invention accordingly relates to a thermoplastic polyurethane as described above, wherein at least one chain extender selected from the group consisting of compounds having at least two isocyanate-reactive functional groups is used.

Examples of suitable chain extenders are compounds selected from the group consisting of aliphatic and aromatic dials having a molecular weight of <500 g/mol, preferably <350 g/mol. In a further embodiment, the present invention also relates to a thermoplastic polyurethane as described above, wherein at least one further chain extender (KV2) selected from the group consisting of aliphatic and aromatic dials having a molecular weight of <500 g/mol is used.

It is preferable according to the invention for the further chain extenders (KV2) used to be diols. Here, aliphatic, araliphatic, aromatic and/or cycloaliphatic diols having a molecular weight of from 50 g/mol to 220 g/mol can preferably be used. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, butane-1,4-diol, hexane-1,6-diol and hydroquinone bis(2-hydroxyethyl) ether.

Also suitable as chain extenders within the context of the present invention are branched compounds such as cyclohexane-1,4-dimethanol, 2-butyl-2-ethylpropanediol, neopentyl glycol, 2,2,4-trimethylpentane-1,3-diol, pinacol, 2-ethylhexane-1,3-diol, cyclohexane-1,4-diol or N-phenyldiethanolamine. Likewise suitable are mixed compounds such as for example 4-aminobutanol.

Within the context of the present invention, the amount of the chain extender and of the polyol composition used may vary within broad ranges. For example, the component (iii) and the component (ii) are used in a molar ratio of (iii) to (ii) of 1:0.7, 1:2.7 and 1:7.3.

According to the invention, the polyol composition comprises at least one polyester polyol (P1). According to the invention, the polyol composition may also comprise further polyols. Suitable polyols are known in principle to those skilled in the art and described for example in "Kunststoffhandbuch [Plastics Handbook], volume 7, Polyurethane [Polyurethanes]", Carl Hanser Verlag, 3rd edition 1993, chapter 3.1. Particular preference is given to using polyesterols or polyetherols as polyols. It is likewise possible to use polycarbonates. Copolymers may also be used in the context of the present invention. The number-average molecular weight of the polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

Polyetherols, but also polyesterols, block copolymers and hybrid polyols such as for example poly(ester/amide), are suitable according to the invention. According to the invention, preferred polyetherols are polyethylene glycols, polypropylene glycols, polyadipates, polycarbonates, polycarbonate diols and polycaprolactone.

In a further embodiment, the present invention also relates to a thermoplastic polyurethane as described above, wherein the polyol composition comprises a polyol selected from the group consisting of polyetherols, polyesterols, polycaprolactones and polycarbonates.

Suitable block copolymers are for example those having ether and ester blocks, such as for example polycaprolactone having polyethylene oxide or polypropylene oxide end blocks, or else polyethers having polycaprolactone end blocks. According to the invention, preferred polyetherols are polyethylene glycols and polypropylene glycols. Polycaprolactone is also preferred.

The polyol composition preferably has an average functionality of between 1.8 and 2.3, preferably between 1.9 and 2.2, especially 2. The polyols used in accordance with the invention preferably have solely primary hydroxyl groups.

According to the invention, the polyol composition may also comprise a solvent. Suitable solvents are known per se to those skilled in the art.

According to the invention, the component (i) used for the preparation of the thermoplastic polyurethane is a polyisocyanate composition comprising at least one polyisocyanate. Preferred polyisocyanates within the context of the present invention are diisocyanates, especially aliphatic or aromatic diisocyanates, further preferably aromatic diisocyanates.

In a further embodiment, the present invention therefore relates to a thermoplastic polyurethane as described above, wherein the polyisocyanate is an aliphatic or aromatic diisocyanate.

In addition, within the context of the present invention, pre-reacted products may be used as isocyanate components, in which some of the OH components are reacted with an isocyanate in a preceding reaction step. The products obtained are reacted with the remaining OH components in a subsequent step, the actual polymer reaction, thus forming the thermoplastic polyurethane.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanate-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methyl-2,4- and/or 1-methylcyclohexane 2,6-diisocyanate, methylene dicyclohexyl 4,4'-, and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

Suitable aromatic diisocyanates are especially naphthylene 1,5-diisocyanate (NDI), tolylene 2,4- and/or 2,6-diisocyanate (TDI), diphenylmethane 2,2'-, 2,4'- and/or 4,4'-diisocyanate (MDI), 3,3'-dimethyl-4,4'-diisocyanatodiphenyl (TODI), p-phenylene diisocyanate (PDI), diphenylethane 4,4'-diisocyanate (EDI), diphenylmethane diisocyanate, 3,3"-dimethyldiphenyl diisocyanate, diphenylethane 1,2-diisocyanate and/or phenylene diisocyanate.

In a further embodiment, the present invention therefore relates to a thermoplastic polyurethane as described above, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2'-diisocyanate (H12MDI) and isophorone diisocyanate (IPDI).

Preferred examples of higher-functionality isocyanates are triisocyanates, for example triphenylmethane 4,4',4"-triisocyanate, also the cyanurates of the aforementioned diisocyanates, and also the oligomers obtainable by partial reaction of diisocyanates with water, for example the biurets of the aforementioned diisocyanates, and additionally oligomers that can be obtained by specific reaction of semi-blocked diisocyanates with polyols having on average more than two and preferably three or more hydroxyl groups.

According to the invention, the polyisocyanate composition may also comprise one or more solvents. Suitable solvents are known to those skilled in the art. Suitable examples are nonreactive solvents such as ethyl acetate, methyl ethyl ketone and hydrocarbons.

Also furthermore usable within the context of the present invention are crosslinkers, for example the aforementioned higher-functionality polyisocyanates or polyols or else other higher-functionality molecules having a plurality of isocyanate-reactive functional groups. It is likewise possible within the context of the present invention to achieve crosslinking of the products through an excess of the isocyanate groups used in proportion to the hydroxyl groups.

According to the invention, the components (i) to (iii) are used in a ratio such that the molar ratio of the sum of the functionalities of the polyol composition and chain extenders used to the sum of the functionalities of the isocyanate composition used is in the range from 1:0.8 to 1:1.3. The ratio is preferably in the range from 1:0.9 to 1:1.2, more preferably in the range from 1:0.965 to 1:1.11, more preferably in the range from 1:0.97 to 1:1.11, more preferably in the range from 1:0.97 to 1:1.05, particularly preferably in the range from 1:0.98 to 1:1.03.

In a further embodiment, the present invention relates to a thermoplastic polyurethane as described above, wherein the molar ratio of the sum of the functionalities of the polyol composition and chain extenders used to the sum of the functionalities of the isocyanate composition used is in the range from 1:0.8 to 1:1.3.

A further parameter taken into account in the reaction of the components (i) to (iii) is the isocyanate index. The index is defined in this case by the ratio of the isocyanate groups of component (i) used in total in the reaction to the isocyanate-reactive groups, that is to say in particular the groups of components (ii) and (iii). At an index of 1000 there is one active hydrogen atom for each isocyanate group of component (i). At indices above 1000 there are more isocyanate groups than isocyanate-reactive groups. The index in the reaction of the components (i) to (iii) is preferably in the range from 965 to 1110, for example in the range from 970 to 1110, more preferably in the range from 970 to 1050, particularly preferably in the range from 980 to 1030.

In a further embodiment, the present invention relates to a thermoplastic polyurethane as described above, wherein the index in the reaction is in the range from 965 to 1100.

According to the invention, further additives, for example catalysts or auxiliaries and additions, may be added during the reaction of the components (i) to (iii). Additions and auxiliaries are known per se to those skilled in the art. It is also possible in accordance with the invention to use combinations of two or more additives.

Within the context of the present invention, the term "additive" is in particular understood to mean catalysts, auxiliaries and additions, especially stabilizers, nucleating agents, release agents, demolding aids, fillers, flame retardants or crosslinkers.

Suitable additives or additions are for example stabilizers, nucleating agents, fillers, for example silicates, or crosslinkers, for example polyfunctional aluminosilicates.

In a further embodiment, the present invention accordingly relates to a thermoplastic polyurethane as described above, wherein the thermoplastic polyurethane comprises at least one additive.

Examples of auxiliaries and additions include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additions can be found, for example, in Kunststoffhandbuch [Plastics Handbook], volume VII, edited by Vieweg and Höchtlen, Carl Hansen Verlag, Munich 1966 (pp. 103-113).

Suitable catalysts are likewise known in principle from the prior art. Suitable catalysts are for example organic metal compounds selected from the group consisting of tin organyls, titanium organyls, zirconium organyls, hafnium organyls, bismuth organyls, zinc organyls, aluminum organyls and iron organyls, for example tin organyl compounds, preferably tin dialkyls such as dimethyltin or diethyltin, or tin organyl compounds of aliphatic carboxylic acids, preferably tin diacetate, tin dilaurate, dibutyltin diacetate, dibutyltin dilaurate, bismuth compounds, such as bismuth alkyl compounds or the like, or iron compounds, preferably iron(MI) acetylacetonate, or the metal salts of carboxylic acids, for example tin(II) isooctoate, tin dioctoate, titanate esters or bismuth(III) neodecanoate.

In a preferred embodiment, the catalysts are selected from tin compounds and bismuth compounds, more preferably tin alkyl compounds or bismuth alkyl compounds. Tin(II) isooctoate and bismuth neodecanoate are particularly suitable.

The catalysts are typically used in amounts of 0 to 2000 ppm, preferably 1 ppm to 1000 ppm, more preferably 2 ppm to 500 ppm and most preferably of 5 ppm to 300 ppm.

The properties of the thermoplastic polyurethanes according to the invention may vary within broad ranges depending on the application.

In a further aspect, the present invention also relates to a process for preparing a thermoplastic polyurethane comprising the reaction of at least the components (i) to (iii):

(i) a polyisocyanate composition comprising at least one polyisocyanate,
(ii) at least one chain extender, and
(iii) at least one polyol composition, wherein the polyol composition comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms.

As regards preferred embodiments of the process, suitable feedstocks or mixing ratios, reference is made to the statements above which apply correspondingly.

The reaction of the components (i) to (iii) may in principle be conducted under reaction conditions known per se. The reaction may in this case be performed discontinuously or else continuously, for example in a belt process or a reactive extrusion process. Suitable processes are described for example in EP 0 922 552 A1 or WO 2006/082183 A1.

The polyurethanes may be produced by the known processes discontinuously or continuously, for example using reactive extruders or the belt process by the one-shot or prepolymer process, preferably by the one-shot process. In these processes, the components to be reacted may be mixed with one another successively or simultaneously, with immediate onset of the reaction. In the extruder process, the synthesis components and also optionally chain extenders, catalyst and/or additions are introduced into the extruder individually or as a mixture, reacted for example at temperatures of 100 to 280° C., preferably 140 to 250° C., and the polyurethane obtained is extruded, cooled and pelletized.

In a preferred embodiment, the reaction of the components (i) to (iii) is conducted at temperatures higher than room temperature.

According to the invention, the heating may be effected in any suitable manner known to those skilled in the art. The feedstocks may preferably also be heated before addition, for example using heatable metering units.

For example, in a reaction using the reactive extrusion process, the reaction is conducted such that the zone temperature is in the range from 170° C. to 245° C., preferably in the range from 180°C. to 235°C., more preferably in the range from 190° C. to 230° C.

According to the invention, it is also possible for the process to comprise further steps, for example a pre-treatment of the components or a post-treatment of the thermoplastic polyurethane obtained. Accordingly, in a further embodiment, the present invention also relates to a process for preparing a thermoplastic polyurethane as described above, wherein the thermoplastic polyurethane obtained is heat-treated after the reaction.

The processing of the polyurethanes according to the invention, which are typically present in the form of granules or in powder form, to give the desired films, moldings, rolls, fibers, automobile trim, hoses, cable connectors, bellows, trailing cables, cable sheathings, seals, belts or damping elements is effected by customary processes, such as for example injection molding, calendering or extrusion.

The thermoplastic polyurethane according to the invention/a thermoplastic polyurethane obtained or obtainable by a process according to the invention may be used in a wide variety of ways. The thermoplastic polyurethanes according to the invention are in particular suitable for the production of moldings and films. Possible applications are for example seals, sealing rings, gaskets, sealing washers, sealing agents, sealing compositions, sealants or shoe outer soles. Further applications are for example hoses for inter alia pneumatic applications, conveyor belts, films, packaging material, cables, flooring applications, shock absorbers and sound absorbers.

In a further aspect, the present invention also relates to the use of a thermoplastic polyurethane as described above or of a thermoplastic polyurethane obtainable or obtained by a process according to the invention for the production of extrusion products, films and shaped bodies, in particular for the production of cable sheathings, hoses and seals.

Accordingly, the present invention also relates to a process for producing a shaped body (SB) comprising the following steps:
(a) preparing a thermoplastic polyurethane, comprising the reaction of at least the components (i) to (iii):
  (i) a polyisocyanate composition comprising at least one polyisocyanate,
  (ii) at least one chain extender, and
  (iii) at least one polyol composition,
    wherein the polyol composition comprises at least one polyester polyol (P1) which is obtainable by reacting an aliphatic dicarboxylic acid having 2 to 12 carbon atoms and a mixture (M1) comprising propane-1,3-diol and a further diol (D1) having 2 to 12 carbon atoms;
(b) producing a shaped body (SB) from the thermoplastic polyurethane.

With regard to the preferred embodiments, reference is made to the statements above. Commonly used processes for producing a shaped body (SB) from the thermoplastic polyurethane as per step (b) are known per se to those skilled in the art. The process may also comprise further steps between steps (a) and (b), for example a treatment of the thermoplastic polyurethane or a temperature treatment.

In a further embodiment, the present invention also relates to the use of a thermoplastic polyurethane as described above or of a thermoplastic polyurethane obtainable or obtained by a process according to the invention for the production of extrusion products, films and shaped bodies, wherein the extrusion product, the film or the sheet is reinforced with fillers.

It has been found that, surprisingly, the thermoplastic polyurethanes according to the invention or the thermoplastic polyurethanes obtained by a process according to the invention are well-suited for the production of foamed materials. The thermoplastic polyurethanes according to the invention may be processed into foamed materials here in a manner known per se. Additions such as blowing agents, cell regulators, surface-active substances, nucleating agents, fillers, hollow microspheres and/or release agents are optionally employed here. Suitable processes and additions are disclosed for example in WO2014/198779 A1, in WO 2007/082838 A1 or WO 94/20568 A1.

In a further aspect, the present invention therefore also relates to the use of a thermoplastic polyurethane as described above or of a thermoplastic polyurethane obtainable or obtained by a process according to the invention for the production of foamed films, foamed moldings or foamed particles and also of the particle foams obtainable therefrom.

In a further embodiment, the present invention also relates to the use of a thermoplastic polyurethane as described above or of a thermoplastic polyurethane obtainable or obtained by a process according to the invention for the production of foamed films, foamed moldings or foamed particles and also of the particle foams obtainable therefrom, wherein the foamed films, foamed moldings or foamed particles and particle foams obtainable therefrom are reinforced with fillers.

Within the context of the present invention, the thermoplastic polyurethane according to the invention or a thermoplastic polyurethane obtained or obtainable by the process according to the invention can also be used in polymer compositions or polymer blends. Such polymer compositions or polymer blends comprise the thermoplastic polyurethane according to the invention or a thermoplastic polyurethane obtained or obtainable by the process according to the invention and also one or more further polymers. Accordingly, the present invention also relates to the use of a thermoplastic polyurethane as described above or of a thermoplastic polyurethane obtainable or obtained by a process according to the invention for the production of polymer compositions.

Further embodiments of the present invention can be found in the claims and the examples. It will be appreciated that the features of the subject matter/processes/uses according to the invention that are mentioned above and elucidated below are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but these do not restrict the present invention. In particular, the present invention also encompasses those embodiments which result from the dependency references and hence combinations specified hereinafter.

1. A thermoplastic polyurethane obtainable or obtained by reacting at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and a further dial (D1) having 2 to 12 carbon atoms.
2. The thermoplastic polyurethane according to embodiment 1, wherein the diol (D1) is selected from the group consisting of ethylene glycol, butane-1,4-diol and hexane-1,6-diol.
3. The thermoplastic polyurethane according to embodiment 1, wherein the diol (D1) is butane-1,4-diol.
4. The thermoplastic polyurethane according to any of embodiments 1 to 3, wherein the aliphatic dicarboxylic acid is adipic acid.
5. The thermoplastic polyurethane according to any of embodiments 1 to 4, wherein the mixture (M1) comprises propane-1,3-diol and the diol (D1) in a ratio in the range from 3:1 to 1:3.
6. The thermoplastic polyurethane according to any of embodiments 1 to 5, wherein the mixture (M1) comprises a further diol.

7. The thermoplastic polyurethane according to any of embodiments 1 to 6, wherein the polyester polyol (P1) has a molecular weight Mw in the range from 750 to 3000 g/mol.
8. The thermoplastic polyurethane according to any of embodiments 1 to 7, wherein the chain extender used in (ii) is selected from the group consisting of aliphatic and aromatic diols having a molecular weight of <500 g/mol.
9. The thermoplastic polyurethane according to any of embodiments 1 to 8, wherein the polyisocyanate is an aliphatic or aromatic diisocyanate.
10. The thermoplastic polyurethane according to any of embodiments 1 to 9, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2'-diisocyanate (H12MDI) and isophorone diisocyanate (IPDI).
11. A process for preparing a thermoplastic polyurethane comprising the reaction of at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and a further dial (D1) having 2 to 12 carbon atoms.
12. The process according to embodiment 11, wherein the diol (D1) is selected from the group consisting of ethylene glycol, butane-1,4-diol and hexane-1,6-diol.
13. The process according to embodiment 11, wherein the dial (D1) is butane-1,4-diol.
14. The process according to any of embodiments 11 to 13, wherein the aliphatic dicarboxylic acid is adipic acid.
15. The process according to any of embodiments 11 to 14, wherein the mixture (M1) comprises propane-1,3-diol and the dial (D1) in a ratio in the range from 3:1 to 1:3.
16. The process according to any of embodiments 11 to 15, wherein the mixture (M1) comprises a further diol.
17. The process according to any of embodiments 11 to 16, wherein the polyester polyol (P1) has a molecular weight Mw in the range from 750 to 3000 g/mol.
18. The process according to any of embodiments 11 to 17, wherein the chain extender used in (ii) is selected from the group consisting of aliphatic and aromatic diols having a molecular weight of <500 g/mol.
19. The process according to any of embodiments 11 to 18, wherein the polyisocyanate is an aliphatic or aromatic diisocyanate.
20. The process according to any of embodiments 11 to 19, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4°- and/or 2,2'-diisocyanate (H12MDI) and isophorone diisocyanate (IPDI).
21. A process for producing a shaped body (SB) comprising the following steps:
   (a) preparing a thermoplastic polyurethane, comprising the reaction of at least the components (i) to (iii):
      (i) a polyisocyanate composition comprising at least one polyisocyanate,
      (ii) at least one chain extender, and
      (iii) at least one polyol composition,
      wherein the polyol composition comprises at least one polyester polyol (P1) which is obtainable by reacting an aliphatic dicarboxylic acid having 2 to 12 carbon atoms and a mixture (M1) comprising propane-1,3-diol and a further dial (D1) having 2 to 12 carbon atoms;
   (b) producing a shaped body (SB) from the thermoplastic polyurethane.
22. The process according to embodiment 21, wherein the diol (D1) is selected from the group consisting of ethylene glycol, butane-1,4-diol and hexane-1,6-diol.
23. The process according to embodiment 21, wherein the dial (D1) is butane-1,4-diol.
24. The process according to any of embodiments 21 to 23, wherein the aliphatic dicarboxylic acid is adipic acid.
25. The process according to any of embodiments 21 to 24, wherein the mixture (M1) comprises propane-1,3-diol and the dial (D1) in a ratio in the range from 3:1 to 1:3.
26. The process according to any of embodiments 21 to 25, wherein the mixture (M1) comprises a further diol.
27. The process according to any of embodiments 21 to 26, wherein the polyester polyol (P1) has a molecular weight Mw in the range from 750 to 3000 g/mol.
28. The process according to any of embodiments 21 to 27, wherein the chain extender used in (ii) is selected from the group consisting of aliphatic and aromatic diols having a molecular weight of <500 g/mol.
29. The process according to any of embodiments 21 to 28, wherein the polyisocyanate is an aliphatic or aromatic diisocyanate.
30. The process according to any of embodiments 21 to 29, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4°- and/or 2,2'-diisocyanate (H12MDI) and isophorone diisocyanate (IPDI).
31. The use of a thermoplastic polyurethane according to any of embodiments 1 to 10 or of a thermoplastic polyurethane obtainable or obtained by a process according to any of embodiments 11 to 20 for the production of extrusion products, films and shaped bodies.
32. The use according to embodiment 31, wherein the extrusion product, the film or the sheet is reinforced with fillers.
33. The use of a thermoplastic polyurethane according to any of embodiments 1 to 10 or of a thermoplastic polyurethane obtainable or obtained by a process according to any of embodiments 11 to 20 for the production of polymer compositions.
34. A thermoplastic polyurethane obtainable or obtained by reacting at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol.
35. The thermoplastic polyurethane according to embodiment 34, wherein the aliphatic dicarboxylic acid is adipic acid.

36. The thermoplastic polyurethane according to embodiment 34 or 35, wherein the mixture (M1) comprises propane-1,3-diol and butane-1,4-diol in a ratio in the range from 3:1 to 1:3.
37. The thermoplastic polyurethane according to any of embodiments 34 to 36, wherein the mixture (M1) comprises hexane-1,6-diol.
38. The thermoplastic polyurethane according to any of embodiments 34 to 37, wherein the mixture (M1) consists of propane-1,3-diol and butane-1,4-diol.
39. The thermoplastic polyurethane according to any of embodiments 34 to 38, wherein the polyester polyol (P1) has a molecular weight Mw in the range from 750 to 3000 g/mol.
40. The thermoplastic polyurethane according to any of embodiments 34 to 39, wherein the chain extender used in (ii) is selected from the group consisting of aliphatic and aromatic diols having a molecular weight of <500 g/mol.
41. The thermoplastic polyurethane according to any of embodiments 34 to 40, wherein the polyisocyanate is an aliphatic or aromatic diisocyanate.
42. The thermoplastic polyurethane according to any of embodiments 34 to 41, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2'-diisocyanate (H12MDI) and isophorone diisocyanate (IPDI).
43. A thermoplastic polyurethane obtainable or obtained by reacting at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol,
   wherein the aliphatic dicarboxylic acid is adipic acid and mixture 1 consists of propane-1,3-diol and butane-1,4-diol.
44. A thermoplastic polyurethane obtainable or obtained by reacting at east the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol,
   wherein the mixture (M1) comprises propane-1,3-diol and butane-1,4-diol in a ratio in the range from 3:1 to 1:3.
45. A thermoplastic polyurethane obtainable or obtained by reacting at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol,
   wherein the aliphatic dicarboxylic acid is adipic acid, and
   wherein the mixture (M1) comprises propane-1,3-diol and butane-1,4-diol in a ratio in the range from 3:1 to 1:3.
46. A thermoplastic polyurethane obtainable or obtained by reacting at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol,
   wherein the aliphatic dicarboxylic acid is adipic acid,
   wherein the mixture (M1) comprises propane-1,3-diol and butane-1,4-diol in a ratio in the range from 3:1 to 1:3,
   wherein the polyester polyol (P1) has a molecular weight Mw in the range from 750 to 3000 g/mol,
   wherein the chain extender used in (ii) is selected from the group consisting of aliphatic and aromatic diols having a molecular weight of <500 g/mol, and
   wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2°-diisocyanate (H12MDI) and isophorone diisocyanate (IPDI).
47. A thermoplastic polyurethane obtainable or obtained by reacting at east the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol,
   wherein the aliphatic dicarboxylic acid is adipic acid,
   wherein the mixture (M1) comprises hexane-1,6-diol,
   wherein the polyester polyol (P1) has a molecular weight Mw in the range from 750 to 3000 g/mol,
   wherein the chain extender used in (ii) is selected from the group consisting of aliphatic and aromatic diols having a molecular weight of <500 g/mol,
   wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2'-diisocyanate (H12MDI) and isophorone diisocyanate (IPDI).
48. A process for preparing a thermoplastic polyurethane comprising the reaction of at least the components (i) to (iii):
   (i) a polyisocyanate composition comprising at least one polyisocyanate,
   (ii) at least one chain extender, and
   (iii) at least one polyol composition,
   wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol.

49. A process for producing a shaped body (SB) comprising the following steps:
    (a) preparing a thermoplastic polyurethane, comprising the reaction of at least the components (i) to (iii):
        (i) a polyisocyanate composition comprising at least one polyisocyanate,
        (ii) at least one chain extender, and
        (iii) at least one polyol composition,
            wherein the polyol composition comprises at least one polyester polyol (P1) which is obtainable by reacting an aliphatic dicarboxylic acid having 2 to 12 carbon atoms and a mixture (M1) comprising propane-1,3-diol and butane-1,4-diol;
    (b) producing a shaped body (SB) from the thermoplastic polyurethane.
50. The process according to embodiment 48 or 49, wherein the aliphatic dicarboxylic acid is adipic acid.
51. The process according to any of embodiments 48 to 50, wherein the mixture (M1) comprises propane-1,3-diol and butane-1,4-diol in a ratio in the range from 3:1 to 1:3.
52. The process according to any of embodiments 48 to 51, wherein the mixture (M1) comprises hexane-1,6-diol.
53. The process according to any of embodiments 48 to 52, wherein the polyester polyol (P1) has a molecular weight Mw in the range from 750 to 3000 g/mol.
54. The process according to any of embodiments 48 to 53, wherein the chain extender used in (ii) is selected from the group consisting of aliphatic and aromatic diols having a molecular weight of <500 g/mol.
55. The process according to any of embodiments 48 to 54, wherein the polyisocyanate is an aliphatic or aromatic diisocyanate.
56. The process according to any of embodiments 48 to 55, wherein the polyisocyanate is selected from the group consisting of methylene diphenyl diisocyanate (MDI), tolylene 2,4- and/or 2,6-diisocyanate (TDI), hexamethylene 1,6-diisocyanate (HDI), methylene dicyclohexyl 4,4'-, 2,4'- and/or 2,2'-diisocyanate (H12MDI) and isophorone diisocyanate (IPDI).
57. The use of a thermoplastic polyurethane according to any of embodiments 1 to 14 or of a thermoplastic polyurethane obtainable or obtained by a process according to any of embodiments 48 or 50 to 56 for the production of extrusion products, films and shaped bodies.
58. The use according to embodiment 57, wherein the extrusion product, the film or the sheet is reinforced with fillers.
59. The use of a thermoplastic polyurethane according to any of embodiments 34 to 47 or of a thermoplastic polyurethane obtainable or obtained by a process according to any of embodiments 48 or 50 to 56 for the production of polymer compositions.

The examples that follow serve to illustrate the invention, but are in no way limiting with regard to the subject matter of the present invention.

EXAMPLES

1. Feedstocks
   The following feedstocks were used:
   Polyol 1: polyester polyol having an OH number of 45.4 and exclusively primary OH groups (based on propane-1,3-diol and butane-1,4-diol (ratio 1:1) and adipic acid, functionality: 2)
   Polyol 2: polyester polyol having an OH number of 56.6 and exclusively primary OH groups (based on propane-1,3-diol and butane-1,4-diol (ratio 1:3) and adipic acid, functionality: 2)
   Polyol 3: polyester polyol having an OH number of 44.0 and exclusively primary OH groups (based on propane-1,3-diol and butane-1,4-diol (ratio 3:1) and adipic acid, functionality: 2)
   Polyol 4: polyester polyol having an OH number of 45.1 and exclusively primary OH groups (based on propane-1,3-diol and hexane-1,6-diol (ratio 1:1) and adipic acid, functionality: 2)
   Polyol 5: polyester polyol having an OH number of 43.3 and exclusively primary OH groups (based on propane-1,3-diol and adipic acid, functionality: 2)
   Polyol 6: polyester polyol having an OH number of 45.2 and exclusively primary OH groups (based on butane-1,4-diol and adipic acid, functionality: 2)
   Diisocyanate 1: aromatic isocyanate (methylene diphenyl 4,4'-diisocyanate)
   CE 1: butane-1,4-diol
   Stabilizer 1: polymeric carbodiimide
   Catalysts: titanium(IV) butoxide (TTB), CAS: 5593-70-4 tin(II) 2-ethylhexanoate (SDO), CAS: 301-10-0

2. Methods:
2.1 Determination of Viscosity:
   Unless stated otherwise, the viscosity of the polyols was determined at 25° C. according to DIN EN ISO 3219 (1994) with a Rheotec RC 20 rotary viscometer using the CC 25 DIN spindle (spindle diameter: 12.5 mm; internal diameter of measuring cylinder: 13.56 mm) at a shear rate of 50 1/s.
2.2 Measurement of Hydroxyl Number:
   Hydroxyl numbers were determined by the phthalic anhydride method DIN 53240 (1971-12) and reported in mg KOH/g.
2.3 Measurement of Acid Number:
   Acid number was determined to DIN EN 1241 (1998-05) and is reported in mg KOH/g.

3. Preparation of the Polyols
3.1 Example 1 (ADA/P1,3/B1,4 (1:1), Mw: 2500)-Polyol 1
   A 4 l round-neck flask equipped with thermometer, nitrogen inlet, heating mantle, distillation column and stirrer is initially charged with 1828.09 g of adipic acid, 608.72 g of butane-1,4-diol, 514.02 g of propane-1,3-diol, 5 ppm of SDO and 1 ppm of TTB and this is heated to 120° C. After the mixture becomes clear, the temperature is increased first to 150° C. and then in steps to 240° C., and the water is distilled off for several hours at 240° C. After 90% of the calculated water of condensation has been removed, the pressure in the apparatus is reduced to 60 mbar. The water of condensation formed is continuously distilled off until an acid number of below 1 mg KOH/g has been reached. The reaction time was approx. 18 h in total.

A polyester polyol is obtained having a hydroxyl number of 45.4 mg KOH/g, an acid number of 0.79 mg KOH/g and a viscosity of 1423 mPas at 75° C.

3.2 Example 2 (ADA/P1,3/B1,4 (1:3), Mw: 2000)-Polyol 2
   A 4 l round-neck flask equipped with thermometer, nitrogen inlet, heating mantle, distillation column and stirrer is initially charged with 1792.91 g of adipic acid, 914.48 g of butane-1,4-diol, 257.4 g of propane-1,3-diol, 5 ppm of SDO and 1 ppm of TTB and this is heated to 120° C. After the mixture becomes clear, the temperature is increased first to 150° C. and then in steps to 240° C., and the water is distilled off for several hours at 240° C. After 90% of the calculated water of condensation has been removed, the pressure in the apparatus is reduced to 60 mbar. The water of condensation formed is continuously distilled off until an acid number of below 1 mg KOH/g has been reached. The reaction time was approx. 20 h in total.

A polyester polyol is obtained having a hydroxyl number of 56.6 mg KOH/g, an acid number of 0.4 mg KOH/g and a viscosity of 882 mPas at 75° C.

3.3 Example 3 (ADA/P1,3/131,4 (3:1), Mw: 2500)-Polyol 3

A 4 l round-neck flask equipped with thermometer, nitrogen inlet, heating mantle, distillation column and stirrer is initially charged with 1864.56 g of adipic acid, 309.98 g of butane-1,4-diol, 785.28 g of propane-1,3-diol, 5 ppm of SDO and 1 ppm of TTB and this is heated to 120° C. After the mixture becomes clear, the temperature is increased first to 150° C. and then in steps to 240° C., and the water is distilled off for several hours at 240° C. After 90% of the calculated water of condensation has been removed, the pressure in the apparatus is reduced to 60 mbar. The water of condensation formed is continuously distilled off until an acid number of below 1 mg KOH/g has been reached. The reaction time was approx. 17 h in total.

A polyester polyol is obtained having a hydroxyl number of 44.0 mg KOH/g, an acid number of 0.86 mg KOH/g and a viscosity of 1325 mPas at 75° C.

3.4 Example 4 (ADA/P13/H16 (1:1), Mw 2500)-Polyol 4

A 4 l round-neck flask equipped with thermometer, nitrogen inlet, heating mantle, distillation column and stirrer is initially charged with 1694.43 g of adipic acid, 744.21 g of hexane-1,6-diol, 479.22 g of propane-1,3-diol, 5 ppm of SDO and 1 ppm of TTB and this is heated to 120° C. After the mixture becomes clear, the temperature is increased first to 150° C. and then in steps to 240° C., and the water is distilled off for several hours at 240° C. After 90% of the calculated water of condensation has been removed, the pressure in the apparatus is reduced to 60 mbar. The water of condensation formed is continuously distilled off until an acid number of below 1 mg KOH/g has been reached. The reaction time was approx. 21 h in total.

A polyester polyol is obtained having a hydroxyl number of 45.1 mg KOH/g, an acid number of 0.61 mg KOH/g and a viscosity of 1065 mPas at 75° C.

3.5 Example 5 AD P1,3, Mw: 2500)-Polyol 5 (Comparative Example)

A 4 l round-neck flask equipped with thermometer, nitrogen inlet, heating mantle, distillation column and stirrer is initially charged with 1902.45 g of adipic acid and 1066.75 g of propane-1,3-diol and this is heated to 120° C. After the acid has been completely melted, the temperature is increased first to 150° C. and then in steps to 240° C., and the water is distilled off for several hours at 240° C. After 90% of the calculated water of condensation has been removed, the mixture is cooled down to 180° C. and 5 ppm of SDO and 1 ppm of TTB are added. It is subsequently heated back up to 240° C. and the pressure in the apparatus is reduced to 60 mbar. The water of condensation formed is continuously distilled off until an acid number of below 1 mg KOH!g has been reached. The reaction time was approx. 22 h in total.

A polyester polyol is obtained having a hydroxyl number of 43.3 mg KOH/g, an acid number of 0.86 mg KOH/g and a viscosity of 1465 mPas at 75° C.

3.6 Example 6 (ADA/B14, Mw: 2500)-Polyol 6 (Comparative Example)

A 4 l round-neck flask equipped with thermometer, nitrogen inlet, heating mantle, distillation column and stirrer is initially charged with 1758.1 g of adipic acid, 1210.8 g of butane-1,4-diol, 1 ppm of TTB and 5 ppm of SDO and this is heated to 120° C. After the acid has been completely melted, the temperature is increased first to 150° C. and then in steps to 240° C., and the water is distilled off for several hours at 240° C. After 90% of the calculated water of condensation has been removed, the pressure in the apparatus is reduced to 60 mbar. The water of condensation formed is continuously distilled off until an acid number of below 1 mg KOH/g has been reached. The reaction time was approx. 15 h in total.

A polyester polyol is obtained having a hydroxyl number of 45.2 mg KOH/g, an acid number of 0.6 mg KOH/g and a viscosity of 1080 mPas at 75° C.

4. Preparation Examples for TPU Synthesis:

A thermoplastic polyurethane (TPU) was synthesized from diisocyanate, chain extender (CE), stabilizer and polyol according to the formulations in table 1 in a reaction vessel while stirring. The starting temperature was 80° C. After reaching a reaction temperature of 110° C., the solution was poured out onto a heating plate heated to 125° C., and the TPU slab obtained was pelletized after heat treatment (15 h, 80° C.).

TABLE 1

| Composition of the TPUs | | | | | | |
|---|---|---|---|---|---|---|
| | Example 1 | Example 2 | Example 3 | Example 4 | Comparative example 1 | Comparative example 2 |
| Polypl 1 [g] | 950 | | | | | |
| Polyol 2 [g] | | 950 | | | | |
| Polyol 3 [g] | | | 950 | | | |
| Polyol 4 [g] | | | | 950 | | |
| Polypl 5 [g] | | | | | 950 | |
| Polyol 6 [g] | | | | | | 950 |
| Diisocyanate 1 [g] | 526.27 | 559.36 | 522.01 | 525.32 | 517.40 | 527.25 |
| CE 1 [g] | 155.46 | 158.95 | 155.01 | 155.36 | 154.52 | 155.40 |
| Stabilizer 1 [g] | 7.60 | 7.60 | 7.60 | 7.60 | 7.60 | 7.60 |
| Index | 990 | 990 | 990 | 990 | 990 | 990 |

5. Mechanical Properties

The mechanical values of the thermoplastic polyurethanes obtained are listed in table 2. Here, the mechanical properties were determined at room temperature on injection-molded sheets which had been heat-treated at 100° C. for 20 h, according to the following methods:

| | |
|---|---|
| Shore hardness | DIN ISO 7619-1:2012 determined after an indentation time of 3 s. |
| Tensile strength | DIN 53 504 measured on an S2 test specimen, |
| Elongation at break | DIN 53504, |
| Tear propagation resistance | DIN 53 515, |
| Abrasion | DIN 53 516 |

TABLE 2

Mechanical values of the TPUs

| | Example 1 | Example 2 | Example 3 | Example 4 | Comparative example 1 | Comparative example 2 |
|---|---|---|---|---|---|---|
| Shore hardness | 91A | 93A | 92A | 91A | 92A | 92A |
| Tensile strength | 47 MPa | 49 MPa | 44 MPa | 42A | 43 MPa | 45 MPa |
| Elongation at break | 600% | 600% | 620% | 590% | 610% | 580% |
| Tear propagation resistance | 89 kN/m | 93 kN/m | 83 kN/m | 87 kN/m | 79 kN/m | 94 kN/m |
| Abrasion | 52 mm$^3$ | 52 mm$^3$ | 59 mm$^3$ | 47 mm$^3$ | 96 mm$^3$ | 51 mm$^3$ |

6. Blooming Characteristics

The blooming characteristics were analyzed on non-heat-treated injection-molded sheets using an alternating climate test and in the case of storage under standard conditions of temperature and humidity. For the alternating climate test, the test specimens were stored over 2 weeks in each case alternating between 12 hours at −18° C. and at room temperature. The results are summarized in table 3.

TABLE 3

Results of the blooming characteristics of the TPUs

| | Example 1 | Example 2 | Example 3 | Example 4 | Comparative example 1 | Comparative example 2 |
|---|---|---|---|---|---|---|
| Storage under standard conditions of temperature and humidity after 4 months | 0 | 0 | 0 | 0 | 0 | 2 |
| Alternating climate test | 0 | 0 | 0 | 0 | 1 | 2 |

Key:
0 = no bloom; 1 = bloom; 2 = intense bloom

LITERATURE CITED

U.S. Pat. No. 5,695,884
US 2006/0141883 A1
US 2006/0121812 A1
WO 00/51660 A1
WO 2010/107562 A1
Kunststoffhandbuch [Plastics Handbook], volume VII, edited by Vieweg and Höchtlen, Carl Hanser Verlag, Munich, 1966 (pp 103-113)
EP 0 922 552 A1
WO 2006/082183 A1
WO2014/198779 A1
WO 2007/082838 A1
WO 94/20568 A1

The invention claimed is:

1. A thermoplastic polyurethane, obtained by reacting the following components (i) to (iii):
   (i) a polyisocyanate composition comprising a polyisocyanate that is selected from the group consisting of methylene diphenyl diisocyanate (MDI), tolylene 2,4- and 2,6-diisocyanate (TDI), hexamethylene 1,6-diisocyanate (HDI), methylene dicyclohexyl 4,4'-, 2,4'-, and 2,2'-diisocyanate (H12MDI) and isophorone diisocyanate (IPDI),
   (ii) at least one chain extender, and
   (iii) at least one polyol composition,
   wherein the polyol composition comprises at least one polyester polyol (P1) which is obtained by reacting an aliphatic dicarboxylic acid having 2 to 12 carbon atoms, wherein the aliphatic dicarboxylic acid is adipic acid, and a mixture (M1) comprising propane-1,3-diol and a further diol (D1) having 2 to 12 carbon atoms, wherein the D1 is selected from the group consisting of butane-1,4-diol and hexane-1,6-diol,
   and the mixture (M1) comprises propane-1,3-diol and the diol (D1) in a ratio in a range of from 3:1 to 1:3.

2. The thermoplastic polyurethane of claim 1, wherein the diol (D1) is butane-1,4-diol.

3. The thermoplastic polyurethane of claim 1, wherein the mixture (M1) comprises a further diol (D2).

4. The thermoplastic polyurethane of claim 1, wherein the polyester polyol (P1) has a molecular weight Mw in a range of from 750 to 3000 g/mol.

5. The thermoplastic polyurethane of claim 1, wherein the at least one chain extender (ii) is selected from the group consisting of aliphatic and aromatic diols having a molecular weight of <500 g/mol.

6. A process for preparing the thermoplastic polyurethane of claim 1, the process comprising reacting the following components (i) to (iii):

(i) a polyisocyanate composition comprising a polyisocyanate that is selected from the group consisting of methylene diphenyl diisocyanate (MDI), tolylene 2,4- and 2,6-diisocyanate (TDI), hexamethylene 1,6-diisocyanate (HDI), methylene dicyclohexyl 4,4'-, 2,4'-, and 2,2'-diisocyanate (H12MDI) and isophorone diisocyanate (IPDI), (ii) at least one chain extender, and (iii) at least one polyol composition, wherein the polyol composition comprises at least one polyester polyol (P1) which is obtained by reacting an aliphatic dicarboxylic acid having 2 to 12 carbon atoms, wherein the aliphatic dicarboxylic acid is adipic acid, and a mixture (M1) comprising propane-1,3-diol and a further diol (D1) having 2 to 12 carbon atoms, wherein the D1 is selected from the group consisting of butane-1,4-diol and hexane-1,6-diol, and the mixture (M1) comprises propane-1,3-diol and the diol (D1) in a ratio in a range of from 3:1 to 1:3.

7. A process for producing a shaped body (SB), the process comprising:

(a) reacting, to obtain the thermoplastic polyurethane according to claim 1, the following components (i) to (iii):

(i) a polyisocyanate composition comprising a polyisocyanate that is selected from the group consisting of methylene diphenyl diisocyanate (MDI), tolylene 2,4- and 2,6-diisocyanate (TDI), hexamethylene 1,6-diisocyanate (HDI), methylene dicyclohexyl 4,4'-, 2,4'-, and 2,2'-diisocyanate (H12MDI) and isophorone diisocyanate (IPDI), (ii) at least one chain extender, and (iii) at least one polyol composition, wherein the polyol composition comprises at least one polyester polyol (P1) which is obtained by reacting an aliphatic dicarboxylic acid having 2 to 12 carbon atoms, wherein the aliphatic dicarboxylic acid is adipic acid, and a mixture (M1) comprising propane-1,3-diol and a further diol (D1) having 2 to 12 carbon atoms, wherein the D1 is selected from the group consisting of butane-1,4-diol and hexane-1,6-diol, and the mixture (M1) comprises propane-1,3-diol and the diol (D1) in a ratio in a range of from 3:1 to 1:3 and (b) producing a shaped body (SB) with the thermoplastic polyurethane.

8. A process of producing an article, wherein the article is an extrusion product, film, or shaped body, the process comprising obtaining the thermoplastic polyurethane of claim 1.

9. The process of claim 8, the process further comprising reinforcing the extrusion product, film or shaped body with a filler.

10. A process of producing a polymer composition, the process comprising adding the thermoplastic polyurethane of claim 1 to a composition.

11. The thermoplastic polyurethane of claim 1, wherein the polyisocyanate is methylene diphenyl diisocyanate (MDI).

* * * * *